(12) United States Patent
Garceran et al.

(10) Patent No.: US 6,522,888 B1
(45) Date of Patent: Feb. 18, 2003

(54) SYSTEM FOR DETERMINING WIRELESS COVERAGE USING LOCATION INFORMATION FOR A WIRELESS UNIT

(75) Inventors: Julio Antonio Garceran, Randolph, NJ (US); Kathryn W. Hanson, Red Bank, NJ (US); Alex Matusevich, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/387,604

(22) Filed: Aug. 31, 1999

(51) Int. Cl.$^7$ ................................................. H04Q 7/20
(52) U.S. Cl. ...................... 455/456; 455/67.7; 455/423; 455/440; 455/422.424; 455/436; 455/439
(58) Field of Search ................................. 455/423, 422, 455/456, 457, 436, 440, 439, 67.7, 424; 701/207

(56) References Cited

U.S. PATENT DOCUMENTS

| | | | | |
|---|---|---|---|---|
| 4,736,453 A | * | 4/1988 | Schloemer ................... | 455/33 |
| 5,023,900 A | * | 6/1991 | Tayloe et al. ................. | 379/32 |
| 5,105,197 A | * | 4/1992 | Clagett ....................... | 342/419 |
| 5,600,706 A | * | 2/1997 | Dunn et al. .................... | 379/59 |
| 5,608,410 A | * | 3/1997 | Stilp et al. ................... | 342/387 |
| 5,657,487 A | * | 8/1997 | Doner ......................... | 455/456 |
| 5,673,253 A | * | 9/1997 | Shaffer ........................ | 370/229 |
| 5,854,981 A | * | 12/1998 | Wallstedt et al. ............ | 455/439 |
| 5,890,068 A | * | 3/1999 | Fattouche et al. .......... | 455/456 |
| 5,915,221 A | * | 6/1999 | Sawyer et al. ............... | 455/437 |
| 5,945,949 A | * | 8/1999 | Yun ............................. | 342/457 |
| 5,973,643 A | * | 10/1999 | Hawkes et al. ............. | 342/457 |
| 5,982,324 A | * | 11/1999 | Watters et al. ......... | 342/357.06 |
| 5,995,836 A | * | 11/1999 | Wijk et al. .................. | 455/436 |
| 6,006,089 A | * | 12/1999 | Sasaki et al. ............... | 455/423 |

FOREIGN PATENT DOCUMENTS

| | | |
|---|---|---|
| EP | 0431956 A | 6/1991 |
| WO | WO9912228 A | 3/1999 |

OTHER PUBLICATIONS

Mouly, M. et al, "Communications Management," GSM System For Mobile Communications, Lassay–Les–Chateaux, Europe Media, FR, 1993, pp. 500–565, XP000860008.

Beck, R, et al., "Strategies for Handover and a Dynamic Channel Allocation In Micro–Cellular Mobile Radio Systems," 39th IEEE Vehicular Technology Conference, San Francisco, CA, May 1989, pp. 178–185, vol. 1, XP010086252.

Okada, K, et al., "On Dynamic Channel Assignment in Cellular Mobile Radio Systems," IEEE International Symposium on Circuits and Systems, Singapore, Jun. 1991, pp. 938–941, XP000199833.

* cited by examiner

Primary Examiner—Edward F. Urban
Assistant Examiner—Marceau Milord
(74) Attorney, Agent, or Firm—Law Office of John Ligon (57) ABSTRACT

A system for determining coverage in a wireless communications systems uses location information for a wireless unit and collects information on communications between the wireless unit and the wireless communications system in association with the location information. The wireless communications system determines and/or receives location information for the wireless unit along with other information associated with the location information. The information by location can be used to represent the coverage of a geographic region. For example, during communications between a serving base station and a wireless unit, the serving base station could receive and/or determine signal quality measurements of a forward link and/or of a reverse link at a particular location. Additionally, neighboring base stations can monitor the communications and determine and/or receive location information for the location of the wireless unit along with the information associated with or corresponding to the location of the wireless unit. The associated information can be linked with additional parameters, such as wireless unit type, wireless unit identity, frequency, operating conditions and/or base station identity.

16 Claims, 8 Drawing Sheets

| LOC | RSSI | BER | FER | WIRELESS TYPE | WIRELESS ID | TIME OR REFERENCE |
|---|---|---|---|---|---|---|
| | | | | | | |

FIG. 3B

LOCATION ' X '

| $F_B$ | $F_W$ | $RSSI_{F_b}$ | $BER_{F_b}$ | $FER_{F_b}$ | $RSSI_{F_w}$ | $BER_{F_w}$ | $FER_{F_w}$ | WIRELESS TYPE | TIME | TRAFFIC LOAD | $P_{F_b}$ | $P_{F_w}$ | BASE STATION ID | WIRELESS ID |
|---|---|---|---|---|---|---|---|---|---|---|---|---|---|---|
| | | | | | | | | | | | | | | |
| | | | | | | | | | | | | | | |
| | | | | | | | | | | | | | | |

FIG. 3C

LOCATION ' X ' + WIRELESS UNIT ' Z '

| $F_B$ | $F_W$ | $P_{F_b}$ | $P_{F_w}$ | TRAFFIC LOAD | TIME PERIOD | BASE STATION |
|---|---|---|---|---|---|---|
| | | | | | | |
| | | | | | | |
| | | | | | | |
| | | | | | | |

FIG. 4

MOBILE WITH GPS RECEIVER

SYSTEM FOR DETERMINING WIRELESS COVERAGE USING LOCATION INFORMATION FOR A WIRELESS UNIT

BACKGROUND OF THE INVENTION

1. Field of the Invention

This invention relates to wireless communications and, more particularly, to a system for determining cell coverage in a wireless communications system using location information for a wireless unit.

2. Description of Related Art

Figure 1:
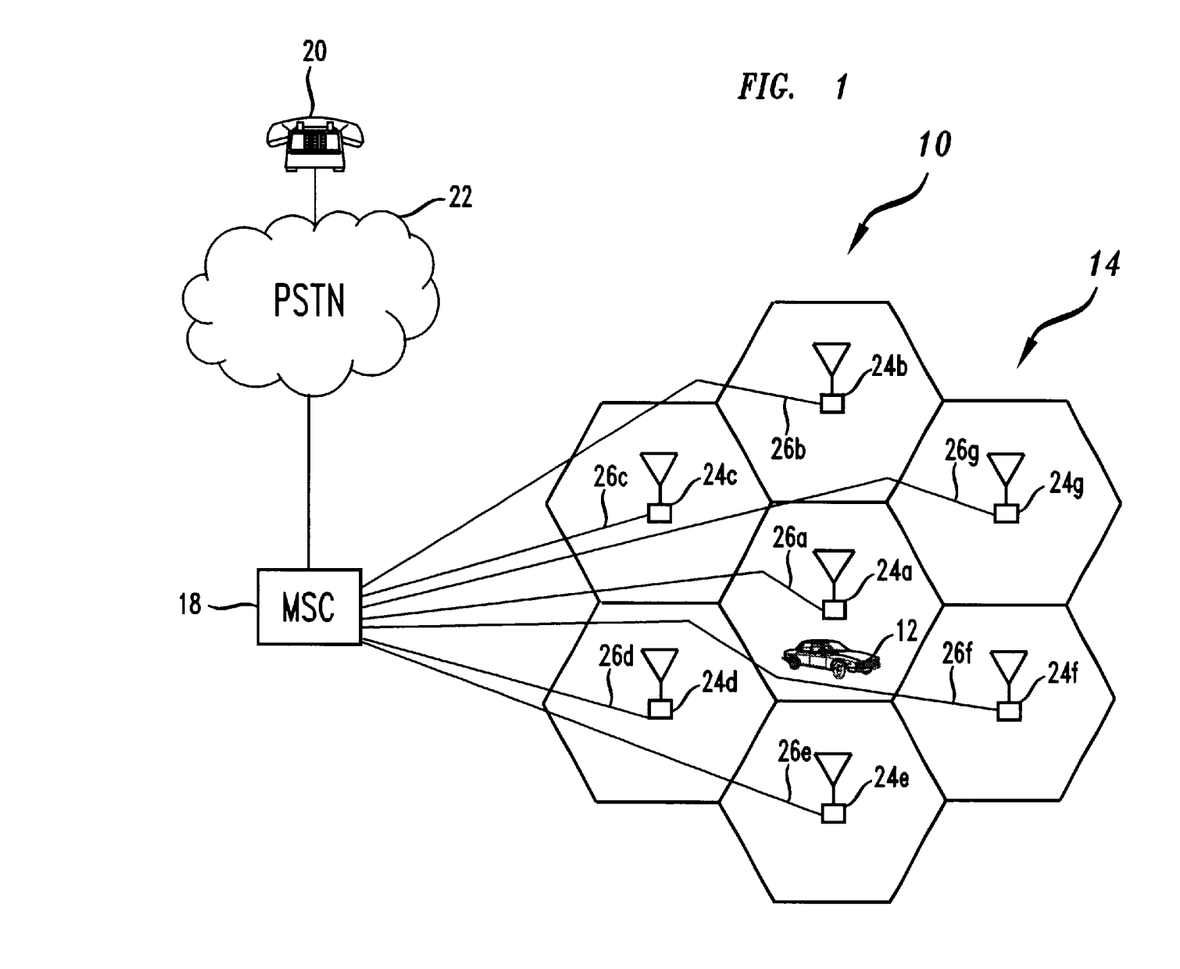
FIG. 1 shows a general diagram of a wireless communications system.

FIG. 1 depicts a schematic diagram of a wireless communications system 10 which provides wireless communications service to a wireless unit 12 that is situated within a geographic region 14. A Mobile Switching Center 18 is responsible for, among other things, establishing and maintaining calls between wireless units and calls between a wireless unit and a wireline unit (e.g., wireline unit 20). As such, the MSC interconnects the wireless units within its geographic region 14 with a public switched telephone network (PSTN) 22. The geographic area serviced by the MSC is divided into spatially distinct areas called "cells." As depicted in FIG. 1, each cell is schematically represented by one hexagon in a honeycomb pattern; in practice, however, each cell has an irregular shape that depends on the topography of the terrain surrounding the cell. Typically, each cell contains a base station (e.g. base stations 24a–g), which comprises the radios and antennas that the base station uses to communicate with the wireless units in that cell. The base stations also comprise the transmission equipment that the base station uses to communicate with the MSC 18 in the geographic area 14 via communication links 26a–g. One cell site may sometimes provide coverage for several sectors. In this specification, cells and sectors are referred to interchangeably.

In a wireless cellular communications system, a base station and a wireless unit communicate voice and/or data over a forward link and a reverse link, wherein the forward link carries communication signals over at least one forward channel from the base station to the wireless unit and the reverse link carries communication signals on at least one reverse channel from the wireless unit to the base station. Within the geographic region 14, the MSC 18 switches a call between base stations in real time as the wireless unit 12 moves between cells, referred to as a handoff. There are many different schemes for determining how wireless units and base stations communicate in a cellular communications system. For example, wireless communications links between the wireless units and the base stations can be defined according to different radio protocols, including time-division multiple access (TDMA), Frequency Division Multiple Access (FDMA), code division multiple access (CDMA) and others.

Currently, in FDMA, TDMA, CDMA and Global System for Mobile Communications (GSM), cell site planning is required to determine the geographic coverage for a cell. Cell site planning is a manually intensive task that needs constant adjustment. In planning a cell, the topology of the geographic area and a suitable antenna site is selected based on availability and zoning rules. Such a selection is typically not optimal but adequate. Drive tests and manually collecting signaling data are then performed mostly on the perimeter of the coverage area. Transmit and receive antennas and power are then adjusted in a manually iterative manner to improve the call quality. Sometimes, frequencies are swapped with neighbor cells and/or transmit power is readjusted to improve the coverage. Over time, the cell site engineers review customer complaints and cell site dropped call reports and again try to manually optimize the RF performance.

SUMMARY OF THE INVENTION

The present invention involves a system for determining coverage in a wireless communications systems using location information for a wireless unit and collecting information on communications between the wireless unit and the wireless communications system in association with the location information. The wireless communications system determines and/or receives location information for the wireless unit along with other information associated with the location information. The information by location can be used to represent the coverage of a geographic region. For example, during communications between a serving base station and a wireless unit, the serving base station could receive and/or determine signal quality measurements of a forward link and/or of a reverse link at a particular location. Additionally, neighboring base stations can monitor the communications and determine and/or receive location information for the location of the wireless unit along with the information associated with or corresponding to the location of the wireless unit. The associated information can be linked with additional parameters, such as wireless unit type, wireless unit identity, frequency, operating conditions and/or base station identity. In accordance with other aspects of the present invention, the information and/or measurements stored by location can be used to derive additional and/or different information by location or determine how the wireless communications system communicates with a wireless unit at a location, for example the base station to service the wireless unit at the location. A wireless unit in a location or range of location(s) could be served by a serving base station(s) at a certain transmit power and frequencies given certain operating conditions or parameters, such as time, weather, traffic load, path loss and/or interference level. A change in operating condition could trigger a dynamic change in the RF coverage provided by the serving base station(s) and/or neighboring base stations to the wireless unit(s) in the location or range of locations.

BRIEF DESCRIPTION OF THE DRAWINGS

Other aspects and advantages of the present invention may become apparent upon reading the following detailed description and upon reference to the drawings in which.

DETAILED DESCRIPTION

Figure 2:
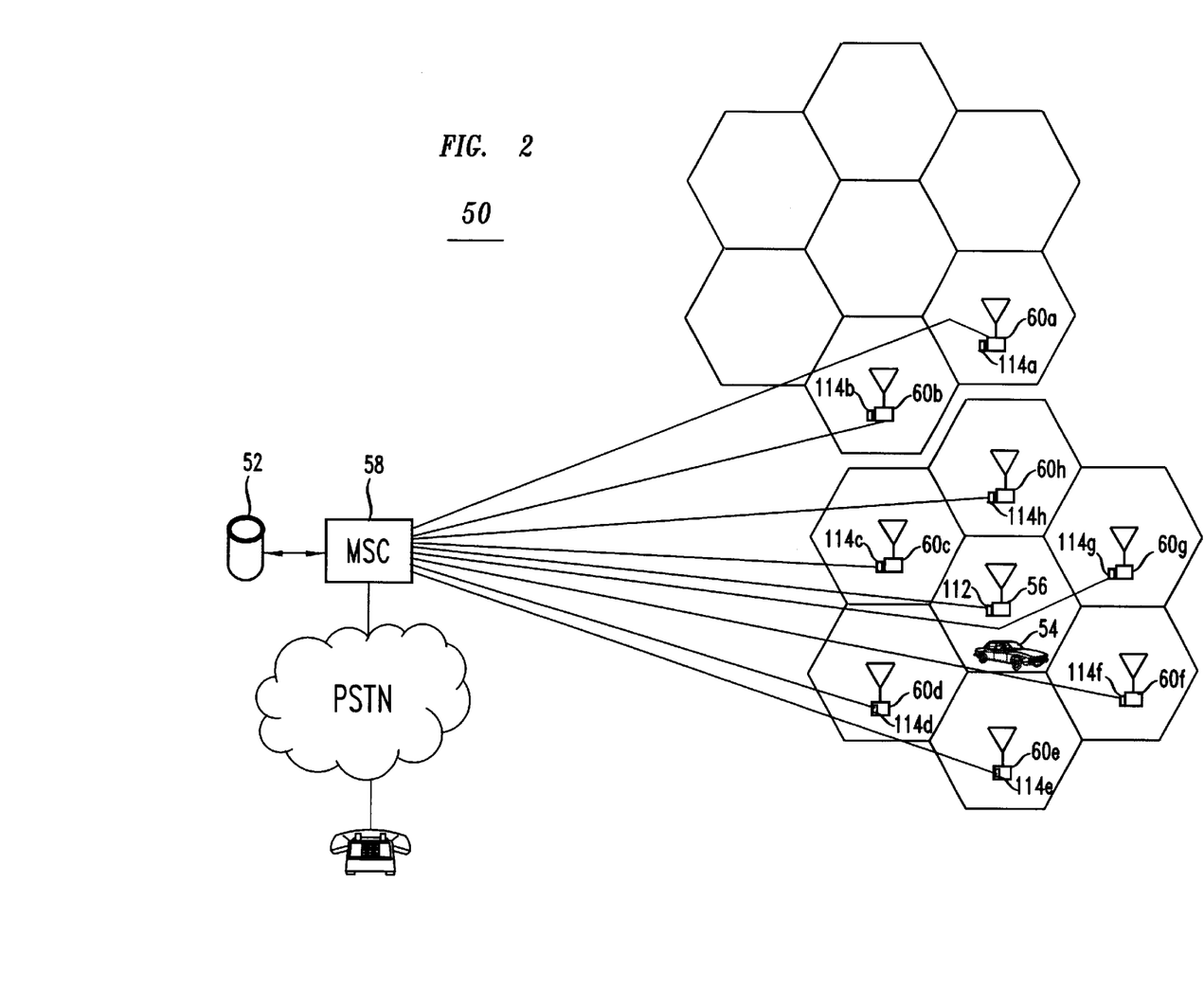
FIG. 2 shows a diagram of a wireless communications system incorporating an embodiment of the handoff system according to certain principles of the present invention.

An illustrative embodiment of a system for determining coverage using location information for the wireless unit according to the principles of the present invention is described below. FIG. 2 shows a portion of a wireless communication system 50 which incorporates a system for determining radio frequency (RF) coverage using location information for a wireless unit communicating with at least one serving base station. The RF coverage system obtains location information for the wireless unit, which includes position, such as latitude/longitude, and can include time, speed, distance and/or direction. While a wireless unit is communicating with a base station, the RF coverage system can dynamically determine RF coverage using the location information from the wireless unit in association with additional information and/or measurements, such as signal quality measurements which can include received signal strength (RSSI), bit error rate (BER) and/or frame error rate (FER), made at the wireless unit and/or at the receiving base station(s), and/or other information or parameters, such as operating conditions, mobile identity, traffic load, frequency, speed, direction, time and/or mobile type.

For example, using the location of the wireless unit and collecting associated or corresponding data for the wireless unit at that location, the wireless communications system 50 can produce an RF database or storage 52 to represent or provide an RF coverage map for a geographic region serviced by a serving base station(s) and/or neighboring base stations. In one embodiment, during a call established between the wireless unit 54 and the serving base station 56, the serving base station periodically requests/receives/determines the wireless unit's position and receives associated information from the wireless unit 54, such as wireless unit type, wireless unit identity, radio signal strength (RSSI), bit error rate (BER), frame error rate (FER) or other signal quality measurements, of the base station's transmit signal at a known frequency, such as on the forward link traffic channel. At the same time, the base station 56 can perform measurements, such as RSSI, BER, FER or other signal quality measurements, of the received signal at the transmit frequency from the wireless unit 54, such as on the reverse link traffic channel.

By storing the information by position in the RF coverage database, the information can be analyzed and used to determine RF coverage for a particular location, such as forward link and/or reverse link frequency, the serving base station(s), handoff candidates, signal power(s). The request from the serving base station 56 can be periodically sent, triggered by a change in the position of the wireless unit, triggered by a signal quality threshold(s) being met, or triggered by a location trigger for which the wireless communications system desires information associated with that location. The wireless unit can determine and/or send the location information or the associated information continuously, periodically, triggered by position changes, triggered by a signal quality threshold(s) being met, triggered by location trigger(s) and/or in response to a request from a base station. The serving base station(s) can request the sending of or determine the location information for a wireless unit using other triggers, for other reasons and/or at different rates, and/or the wireless unit can request/send/determine location information or associated information using other triggers, for other reasons and/or at different rates.

The location information and/or associated information transmitted to the serving base station from the wireless unit can be sent as part of a location message or report to the serving base station on a reverse channel, for example on the reverse setup channel or in the SACCH or FACCH on the reverse voice or traffic channel. The transmitted location information can include current position measurements and/or previous position measurements. The location information can also include other information or parameters, such as signal quality measurements, operating conditions, wireless unit identity, wireless unit type, direction, speed, time and/or distance associated with the current position and/or previous position(s).

Figure 3A:
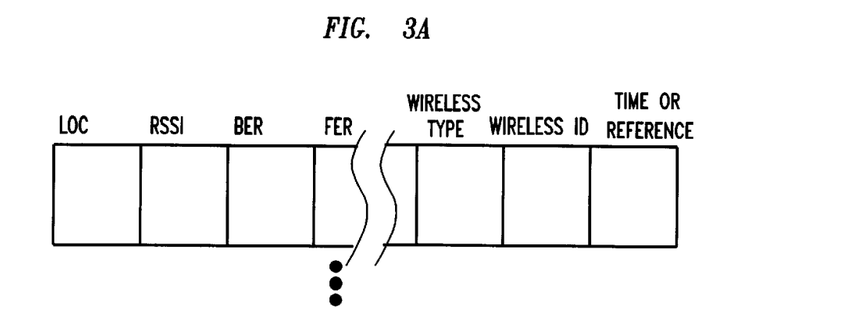
FIGS. 3A–C show information by location of the wireless unit in different forms.

FIG. 3A shows an example of a location message sent from a wireless unit to a at least one serving base station. In this embodiment, the location is determined at the wireless unit along with signal quality measurements RSSI, BER and FER of the transmit frequency for the serving base station (s), wireless unit type, wireless unit identity and time or reference. The time or reference field can be used to ensure that measurements made at the serving base station on the wireless unit transmit frequency, at other locations or at other wireless units in the same location can be associated with measurements of the base station transmit frequency made at the same time for the particular location.

In addition to the serving base station's receiver measurements and the wireless unit's receiver measurements being stored by position, the MSC 58 and/or the serving base station 56 can send a message to neighboring base station(s) 60*a–h* to monitor the wireless unit 54 at the transmit frequency of the wireless unit 54 and collect receiver measurements at the neighboring base station(s) 60*a–h* for the location of the wireless unit. For example, during a call, unused radio(s) in the neighboring cell(s) 60*a–h* could monitor the call and receive and/or determine radio signal measurements by location and store the measurements by location. In this example, the neighboring base stations 60*a* and *b* are in an N=7 cell cluster adjacent to the N=7 cell cluster of base stations 56 and 60*c–h*. The information can be stored in a location or RF database or storage 52 by location and another parameter(s), such as base station identity to identify the measurements by the particular base station 56 and 60*a–h*, to provide different sets of information by position. Additionally, information, such as base station transmit frequency and information, can be stored in the database 52 for different base stations by using neighboring base station(s) 60*a–h* to service or monitor a wireless unit 54 in a particular location.

The measurements or information can be stored by location with entries having different fields for the different forms of information or parameters. For a particular location, the information can be stored by particular base station(s) and further fields designating time period, date, traffic density, weather, mobile type, mobile identity, signal quality measurements, certain operating conditions, frequency and/or other parameters. The information can be stored in different manners, and entries can be updated in different ways. For example, for a given base station and mobile type, the information could be stored in the database 52 as individual measurements for a location within a window, for example all measurements in the last seven days for a particular location.

To analyze, process or use the information, the window can be narrowed to search by using different parameters, for example entries in the last month for a location by base station and/or particular wireless unit. The information by location can be manipulated over time or used to derive additional information by location, such as an average or weighted average of certain measurements over time or for a particular times during the day and/or under different parameters or operating conditions. An average, weighted average, cumulative average or a function of the measurements for a particular location and time period and/or other parameter(s), such as traffic density, can be maintained. For example, an average or weighted average of measurements for the location by base station can be stored based on measurements which are over a month old which are made between 3PM and 6PM and when traffic density is above a certain threshold level. These measurements can be continuously or recursively updated or maintained using the current measurements.

The information can be stored by location and linked to a particular base station(s) to determine the RF coverage at particular frequencies and at a particular locations. A window of time could be used to analyze, retrieve or store information associated with a particular geographic location and particular base station(s). The window for measurement entries of a location can be based on a variety of parameters. For example, the window for storing, analyzing or updating the database can be determined by time and traffic density at that point. As such, the database 52 is kept current and any analysis or examination by location to determine RF coverage can be narrowed to a particular set of factors or window of entries defined by particular parameter(s)which are fields of a particular entry, such as location, traffic density, weather, time, date, signal level or interference level, or by parameters or information derived from or a function of different fields in different entries, such as changes in path loss, interference and/or signal level.

Figure 3B:
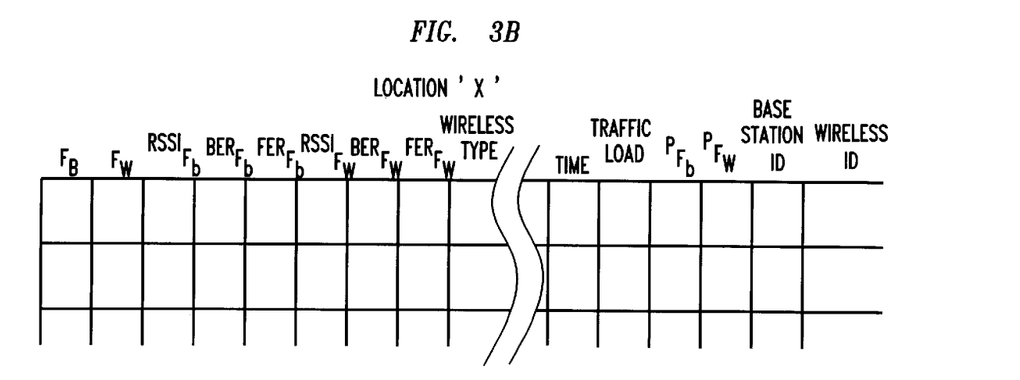

The information for a particular location can be obtained, manipulated, stored and used in a variety of ways depending on the embodiment, and the corresponding location information can also be obtained and associated with a particular location in different ways. For example, FIG. 3B shows example entries in a coverage database for a location 'X'. The location 'X' can be designated by latitude and longitude and include a certain tolerance, for example a radius of 50 meters. Other tolerances or ways to measure tolerances can be used, such as an area encompassing a certain latitude and longitude coordinate or a fraction(s) of a latitude and longitude coordinate depending on the location resolution. In this embodiment, the information in the entries is shown with a variety of parameters, such as base station transmit frequency $F_B$, wireless unit transmit frequency $F_W$, corresponding signal quality measurements $RSSI_{Fb}$, $BER_{Fb}$, $FER_{Fb}$, $RSSI_{Fw}$, $BER_{Fw}$ and $FER_{Fw}$ for communications between the wireless unit identified in the wireless id field of the wireless type identified in wireless type field with corresponding transmit power $P_{Fw}$ and the identified base station under the traffic load conditions designated in the traffic load field at a particular time or time period with a corresponding transmit power $P_{Fb}$. Depending on the embodiment, the signal quality measurements or other parameters can be averages, weighted averages or a function of measurements over a time period or during the time a wireless unit is communicating with the base station at that location. Alternatively, an entry can reflect an individual measurement, and multiple entries can be made for communications between the base station and the wireless unit for a time period at the location.

Figure 3C:
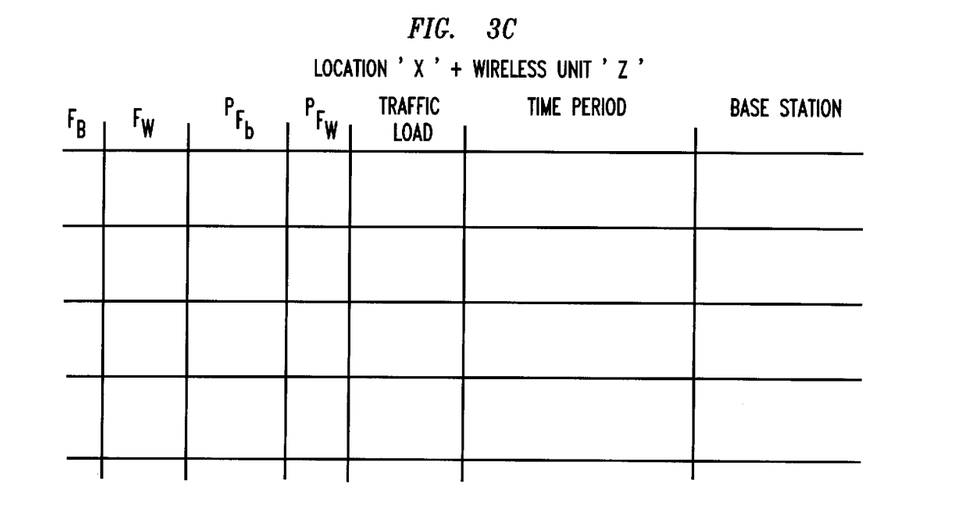

Depending on the implementation, the number of entries or parameters for a location given a particular set of parameters or windows can be different or change, and the number of parameters per entry associated with and/or stored with a location can change or be different. For example, in the entries of FIG. 3B, certain signal quality measurements, such as BER, need not be made, or other parameters can be included, such as weather or speed. Additionally, the coverage database can have different informational structures (for example separate entries can be provided for base station transmit frequencies and wireless unit transmit frequencies) and/or include various databases in which the information associated with location is processed, manipulated, changed or used to derive other information by location depending on a particular purpose for the information by location. For example, FIG. 3C shows information associated with a location 'X' and another parameter, such as the identity of the wireless unit 'Z', which provides information or parameters for the particular wireless unit 'Z' by location, such as the transmit powers $P_{Fb}$ and $P_{Fw}$ for the base stations identified in the base station field and the wireless unit Z for designated transmit frequencies $F_B$ and $F_W$ at designated traffic loads during designated time periods. Such information by location can be derived or processed from or can be a function of the information by location in entries such as those shown in FIG. 3B. Furthermore, individual measurement entries can be stored and later processed to provide more useable information by location. Alternatively, individual measurements can be processed to dynamically update certain information by location entries. The individual measurement entries can be stored separately, such as in a local database, then processed to update information by location in the local and/or in a main database.

Figure 4:
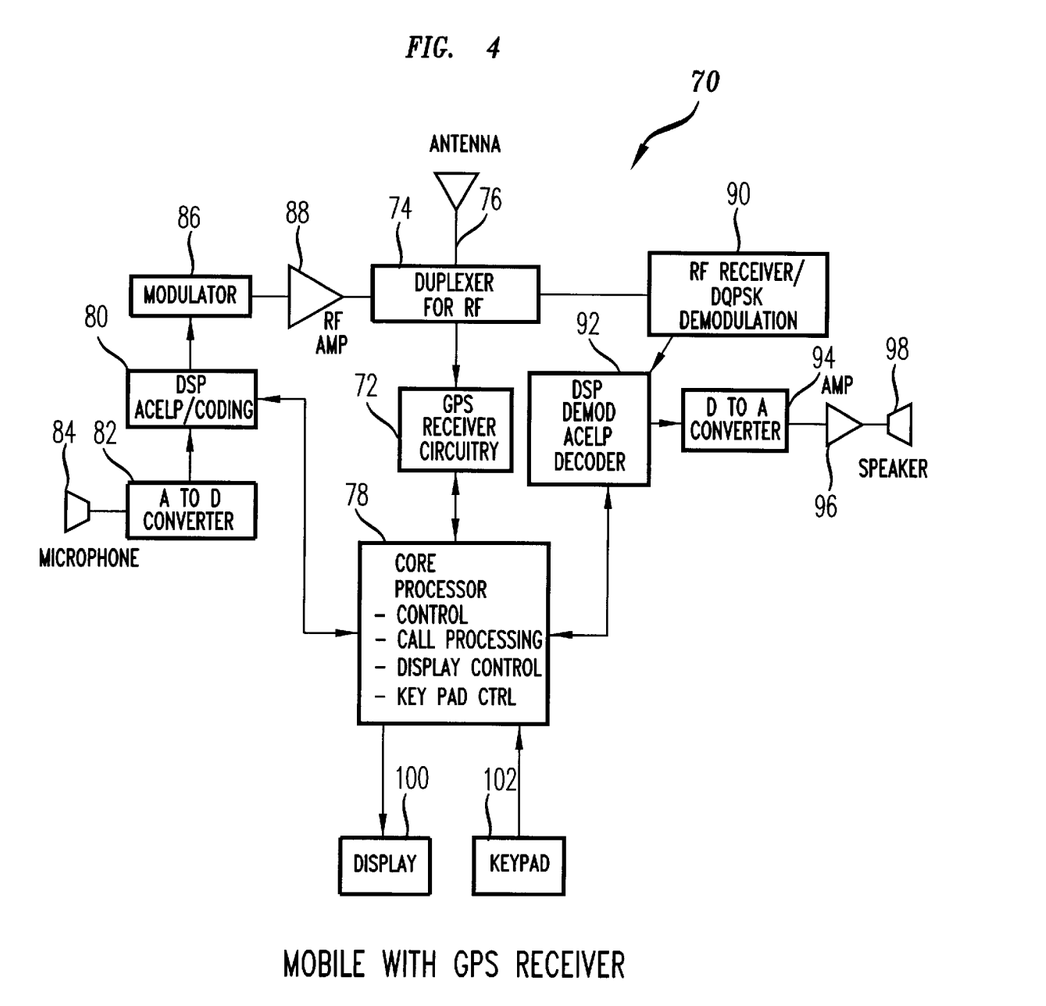
FIG. 4 shows a general block diagram of a wireless unit which can provide location information according to certain aspects of the present invention.

In certain embodiments, the wireless unit determines and sends the location information and associated information to the serving base station(s) and/or neighboring base station (s). With particular reference to FIG. 4, a wireless unit 70 includes GPS receiver circuitry 72 which receives GPS signals from a duplexer 74 which is connected to the antenna 76 of the wireless unit 70. Alternatively, the GPS receiver could use its own dedicated antenna and/or receive circuitry. Through interaction with a GPS system of satellites and control centers as would be understood by one of skill in the art, the GPS receiver circuitry 72 provides a location information which can include time, speed, distance and/or direction for the wireless unit to the processing circuitry 78 of the wireless unit 70. The processing circuitry 78 can receive the location information in alternative ways. For example, the processing circuitry 78 can periodically or continuously monitor the location information from the GPS processing circuitry. The processing circuitry 78 can manipulate the location information into an appropriate format and store any portion of the location information in a storage or memory. For example, the location information can be stored as a position for the wireless unit, such as the latitude and longitude coordinates, in association with the time, direction and/or speed of the wireless unit at the particular position. Location information can be stored along with signal quality measurements of channel(s) to/from the serving base station as well as signal quality measurements for channel(s) to/from other base stations.

Depending on the embodiment, the wireless unit 70 can transmit the location information and associated signal quality or other information to a serving base station 54 (FIG. 2) over a channel on the reverse link. Depending on the radio protocol used to communicate with the serving base station, the forward and reverse links established between the base station and the wireless units have different structures. In North American TDMA as defined by TIA/EIA-136 ("IS-136"), the forward link is composed of a forward voice channel and a forward setup channel, and the reverse link is composed of a reverse voice channel and a reverse setup channel. The location and associated information can be sent from the wireless unit to the serving base station over the forward voice channel, for example in a slow associated control channel (SACCH) portion of a voice frame or in a fast associated control channel (FACCH) of a voice frame. To do so, the location information and associated information can be provided to a signal processing/coding block which processes the location information along with the digital voice signals from an analog to digital converter (A/D) 82, for example, by performing speech coding, channel coding interleaving, encryption and/or multiplexing depending on the embodiment. The analog voice signal to be transmitted originate from a microphone 84. As would be under stood by one of skill in the art, the signals to be transmitted are provided to modulator 86 which modulates the signals, for example using differential quadrature phase shift keying (DQPSK), and converts the signals to analog radio frequencies (RF) for transmission. The radio frequency (RF) signals are amplified at amplifier 88 and transmitted using the antenna 76 after passing through the duplexer 74. The location information or other information used by the handoff system can be transmitted over the forward setup channel using the coder 80, modulator 86, amplifier 88, the duplexer 74 and the antenna 76.

To receive location information requests, the RF signals are received at the antenna 76 and pass through the duplexer 74 to RF receiver and demodulator 90. The RF receiver and demodulator circuitry 90 receives the RF signals and demodulates the signals, for example using DQPSK. The demodulator 90 extracts the encoded, encrypted and/or interleaved information from the signals on the reverse setup channel or in the reverse voice channel and provides the information in digital form to a decoder block 92. The processing/decoder block 92 performs any interleaving, decrypting, channel decoding, speech decoding and/or de-multiplexing of the information signals from the demodulator 90 as would be understood by one of skill in the art. The voice signals are converted from digital to analog at block 94, amplified at block 96 and output to the user at speaker 98. Data signals, such as location information requests from the serving base station can be provided to the processing circuitry which can act on the request. Other data can be displayed on a display 100 or accessed by the user interfacing with a keypad 102.

Figure 5:
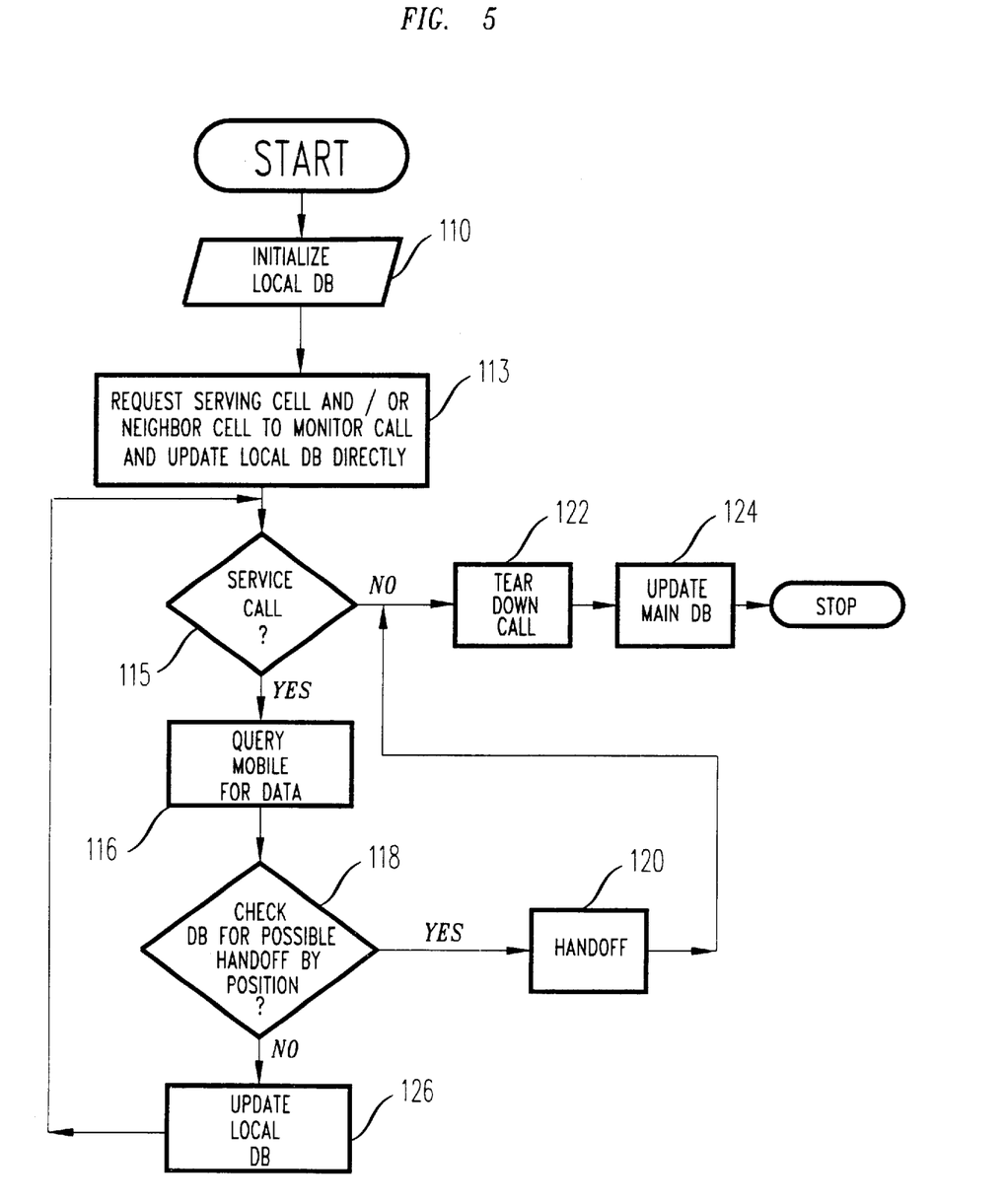
FIG. 5 shows a flow diagram of an embodiment of a system for using and updating an RF coverage database according to certain principles of the present invention.

FIG. 5 shows a flow diagram of one embodiment of a system for storing location and associated information in the RF coverage storage or database 52 (FIG. 2) sent from the wireless unit 54 (FIG. 2) to the serving base station 56 (FIG. 2) and/or determined at the serving base station 56 (FIG. 2) according to the principles of the present invention. At block 110, a local storage or database 112 (FIG. 2 is initialized from a main database 52 (FIG. 2) connected to the MSC 58 (FIG. 2). The data is received and stored by position (latitude and longitude coordinate) with some tolerance (+/− distance or area encompassed by the latitude and longitude coordinate). The positions in the local database 112 can designate the positions making up the coverage area(s) for the serving base station for a particular set(s) of parameters or information. Additionally, for a position, the manner in which the serving base station services the wireless unit at that position can be determined, for example the transmit powers for the serving base station and the wireless unit at the designated frequencies using information by location structured as in FIG. 3C.

In certain embodiments, when a wireless unit registers or is to initiate a call or receive a call, the wireless unit 54 (FIG. 2) transmits location information to the wireless communications system, and based on the location information and a comparison of the local database 112 for the serving base station, the main database 112 of the MSC 58 (FIG. 2), or information derived therefrom, the serving base station 56 is determined which currently services the particular location for the wireless unit 54 (FIG. 2) given the particular conditions or parameters, such as the date, the weather, the particular mobile identification number, and/or traffic load of the candidate base station(s). For example, when a wireless unit registers with the local base station upon powering up, the wireless unit sends location information and wireless unit identification information. When the wireless unit detects a stronger base station, the wireless unit again registers and provides location information and wireless unit identification. The local base station can forward this information to the MSC 58 such that the location of the particular wireless unit 54 (FIG. 2) is known at the MSC 58 and the number of pages, time and processing required to locate a wireless unit and determine the serving base station(s) for an incoming call is reduced. Additionally, if the wireless unit is terminating or originating a call, the wireless unit can send location information in a setup message over a setup channel to local base station(s), and the local base station(s) can examine the location information and through a comparison with the local database(s), the main database(s) and/or information derived therefrom, the serving base station is determined and/or the forward link and/or reverse link frequencies for the wireless unit at that location and given any additional parameters.

Some of the entries from the main database 52 (FIG. 2) can be ignored, discarded, de-emphasized or altered by the main database or the receiving base station as not falling within the window set due to when the entry was made and/or the current parameters or information used to select the entries per location. Accordingly, in this embodiment, given a window or operating parameters or conditions, a local database 112 in the serving base station can be initialized with at least location entries for locations in the coverage area of the serving database corresponding to the current set of conditions or parameters. Given a change in the window or operating conditions, the local database can be initialized with information by location corresponding to the new set of parameters or a subset of the location by information corresponding to the new set of parameters in the local database can be used. If wireless unit identity is a parameter, a coverage area of locations could be established for each wireless unit.

At block 113, the MSC 58 (FIG. 2) requests the serving base station 56 (FIG. 2) and/or any neighboring cells 60a–h to monitor the call and directly update or supplement the local database 112 of the serving base station and/or the local database(s) 114a–h of the neighboring base station 60a–h with information by location of the wireless unit 54 (FIG. 2) and by other parameters if desired, such as type of wireless unit, the wireless unit identification information and/or the transmit frequency. During the call or if the call is active at block 115, the serving base station 56 (FIG. 2) and/or the neighboring base station(s) 60a–h can query the wireless unit 54 at block 116 for data, such as location information and associated information or measurements. The serving cell can send signal quality measurements which can be associated with the location information and other parameters, such as the wireless unit identification, time period, date, forward or downlink traffic frequency, reverse or uplink traffic frequency or other channel frequency. The signal quality measurements of any reverse link frequencies can be made at the serving base station while signal quality measurements for any forward link frequencies can be performed at the wireless unit and transmitted back to the serving base station.

The neighboring base stations 60a–h can be requested by the serving base station through the MSC 58 (or the request can be made directly if a link exists between base stations) or by the MSC 58 to monitor the wireless unit transmit frequency for location information, and the neighboring base station(s) 60a–h makes signal quality measurements of the received signal from the wireless unit by location. Depending on the embodiment, the wireless unit could also perform signal quality measurements by location of a received signal from the neighboring base station(s) 60a–h. For example, the serving base station can send to the wireless unit forward link channel(s) to monitor the forward link channel(s) by location. The wireless unit measures the signal quality, such as received signal strength, of the forward link channel(s) in association with location. The measurements by location could be sent to the serving base station and/or directly to the corresponding neighboring base station(s) 60a–h to be stored in or processed at the serving base station, the MSC and/or neighboring base station(s).

Depending on the implementation, the wireless unit 54 can periodically send a location message or autonomously send a location message, for example based on a change in location, to the serving base station and/or the neighboring base station(s). Alternatively, the serving and/or neighboring base station(s) can send trigger positions to the wireless units or send requests to the wireless unit based on trigger positions which trigger the wireless unit to send location information with associated information or measurements to the serving and/or neighboring base station(s). The position triggers could correspond to locations for which the RF coverage system has determined information is desired, for example locations which correspond to a "hole" in the RF coverage. When a wireless unit is near a hole in the RF coverage, a position trigger can be tripped by the location information for the wireless unit, and the wireless unit can collect information by location and transmit the information by location back to the serving and/or neighboring base stations 60a–h in location messages. Depending on the embodiment, if a location trigger is matched by the location information or for other reasons, the location information and associated information can be collected at a higher rate. The location information and the associated measurements or information can be stored in the wireless unit and subsequently sent to the serving and/or neighboring base station in case of an interruption in the call while the wireless unit is in the hole. In fact, the information by location can be stored in the wireless unit and sent to the serving base station and/or another base station in the form of location messages or a location report when the wireless unit is subsequently connected with the wireless communications system. The receiving base station can store the location messages in the local database 112 and/or forward the location messages to the appropriate MSC or serving base station depending on the location.

When a location message, including location information (which can include information to determine wireless unit location) and associated measurement or other information, is received, the serving base station 54 updates the local database 112 and checks at block 118 for a possible handoff to a neighboring cell 60a–h. If a handoff is necessary, the current serving cell can handoff the call to a neighbor cell 60a–h at block 120, tear down the call at block 122 and update the main database 52 (FIG. 2) at block 124 with the information obtained during the call and stored in the local database 112. If no handoff is required, the serving base station updates the local database 112 at block 126 and continues monitoring the active call by querying the wireless unit for data at block 116. If the call is over at block 115, the serving base station can tear down the call at block 122 and update the main database 52 (FIG. 2) using the entries in the local database(s) 112 or 114a–h.

Depending on the implementation, the serving base station 56 which hands off the call to become a neighboring base station can continue to monitor the call as a neighboring base station. Additionally, when the call is complete or when desired, for example if the local database is full, the local database(s) 112 and 114a–h (FIG. 2), can transfer the local database entries to update the main database 52 (FIG. 2).

To perform a handoff by checking the location information in the location message, a handoff can be performed using location information according to U.S. patent application Ser. No. 09/386,982 filed concurrently with this application, assigned to the same assignee and entitled "System for Performing Handoffs Using Location Information For the Wireless Unit," herein incorporated by reference. For example, the location information for the wireless unit can be examined relative to location information in the main and/or local database or information derived therefrom where entries for a particular location include entries from neighboring base stations which are candidates to service the particular location or which are candidates to be handed off to depending on the set of operating parameters and information or measurements made at the location relative to the candidate base stations. Alternatively, depending on how the information by location is processed or structured, information by location can include a field identifying a candidate base station(s) to which a wireless unit at a particular location is handed off.

In some embodiments, the MSC uses the location information to determine whether the wireless unit is to be handed off and a best candidate for the wireless unit to be handed off. The MSC can determine which base station to handoff to by examining a handoff location information for the serving base station. The handoff location information can include different positions or regions within the serving cell and for the different positions or regions, the corresponding best candidate or candidate base station to be handed off to for a wireless unit in the particular position. The handoff location information can be derived from the measurements or information made by wireless unit location and relative to the serving and candidate or neighboring base stations. The MSC can examine the capacity of the handoff candidates in determining which is the best candidate for the wireless unit in the particular position. Additionally, depending on the embodiment, the speed and/or direction of the wireless unit can be included in the location information and be used by the MSC in determining which is the best candidate to handoff the wireless unit at the particular position traveling at a particular speed and/or direction.

Alternatively, the determination of the best candidate to handoff the wireless unit to can be performed at the wireless unit, serving base station and/or at the MSC. For example, the serving base station can provide the best candidate after examining the location information relative to the measurements or information made by location and relative to the serving base station and candidate base stations or provide a plurality of candidates from which the MSC chooses the best candidate. Alternatively, the MSC can receive the location information and make the determination of whether to handoff the wireless unit and to which candidate base station using the location information and information associated with the location for the candidate or neighboring base stations. Furthermore, the handoff system can determine that more location information is desired to select the best candidate base station. If the wireless unit is to determine whether a handoff is to be made and/or the best candidate base station, handoff location information can be provided to the wireless unit which monitors its location relative to the handoff location information.

In accordance with an aspect of the present invention, the information by location in the RF coverage database is manipulated, analyzed and/or used to change the RF coverage for a location or particular locations. For example, to correct path loss changes at certain locations or poor service locations which are being detected, the transmit power of the serving cell and/or neighbor cells could be adjusted when communicating with wireless units in those locations. Signal path loss could increase or decrease at a slow or fast rate. Path loss changes occur when objects are in the line-of-sight between the transmit and receive antennas and can occur for example due to building construction or destruction or due to highway traffic which is present or absent. The RF coverage system can record path loss as a field for a location and be used to react to the path loss changes. A determination of the base station(s) to service a particular location and how, for example the transmit power used, can be based on or a function of the information stored by location in the RF coverage system. As such, if a location is subject to high path loss, the transmit power for the serving base station can be determined using information by location. If a location(s) within a cell is determined to be better served by a neighbor base station, the wireless unit(s) in a location or range of locations within a serving cell could be serviced by a neighbor base station and/or transmit powers adjusted for the serving base station and/or the neighbor base station(s) accordingly.

Figure 6A:
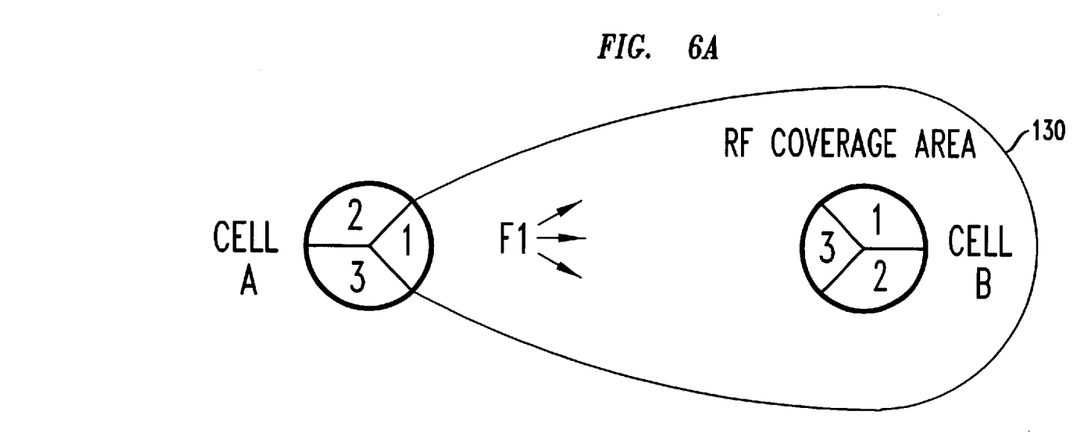
FIGS. 6A and 6B show an example of how the coverage system using location information can be used in a portion of a wireless communications system.
Figure 6B:
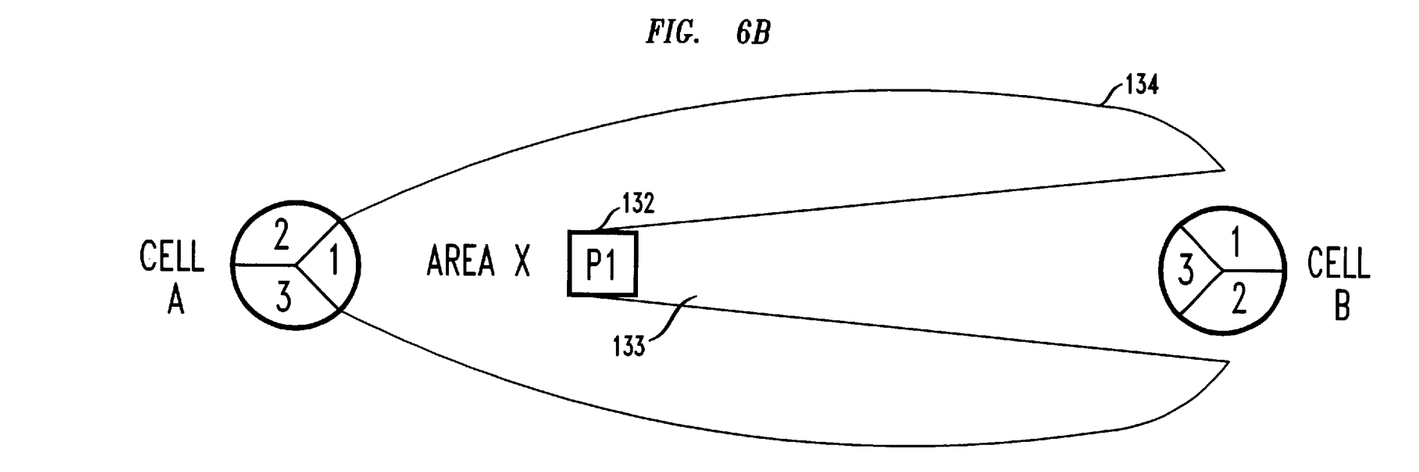

FIGS. 6A and 6B show an example of how the system using the RF coverage database can provide correction of poor service resulting from an increase in path loss in a particular coverage area. For example, if location information with associated information is collected over a period of time, an RF coverage database or map is generated which includes an RF coverage area 130. In this embodiment, the base station for sector or face 1 of Cell A uses frequency F1 in the RF coverage area 130. Although Cell B does not use frequency F1, the base station(s) for Cell B has been collecting data on frequency F1 in the RF coverage area 130. As shown in FIG. 6B, as time passes a building or obstruction 132 is erected at position P1 which changes the RF coverage for frequency F1 from Cell A because the obstruction 132 interferes with the signals at frequency F1 in the geographic region 133. The obstruction 132 could also be a cluster of trees in the spring and summer which have grown leaves. Since the RF database is constantly being updated with serving cell and wireless unit signal information by location, at some point the coverage area 130 for Cell A at frequency F1 changes to the RF coverage area 134. A call being established at a position in the coverage area 130 but falling out of the new coverage area 134 would be handled by a neighbor cell, such as Cell B, which has monitored the RF coverage area 130, and the MSC 58 has determined based on an analysis of the measurements by location between Cells A and B that Cell B should handle calls established at positions within the coverage area 130 but outside the new coverage area 134. For example, for a given set of parameters, the positions in the area 133 can be designated as being covered by Cell B rather than Cell A if the signal quality measurements for Cell B in the area 133 are consistently greater than a threshold and/or than the signal quality measurements of the Cell A in the area 133 or if the path loss from Cell B to the positions in area 133 is determined to be less than the path loss from Cell A to the positions in area 133. Alternatively, by analyzing the information by position and another parameter, such as frequency, the MSC 56 can determine a frequency F2 at which the Cell A and/or Cell B can service wireless units in the positions 133 within the coverage area 130 but outside the coverage area 134.

Figure 7A:
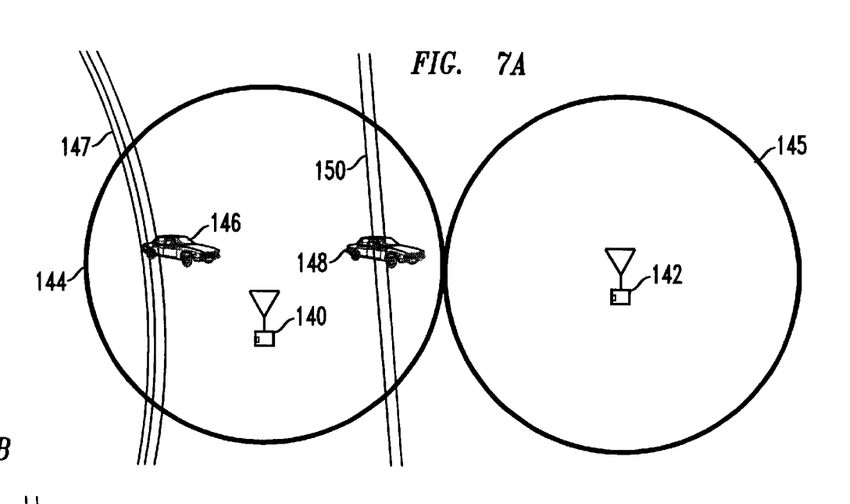
FIGS. 7A and 7B show an example of how the coverage system can be used to change the coverage for a particular location or range of locations based on a change in traffic load.
Figure 7B:
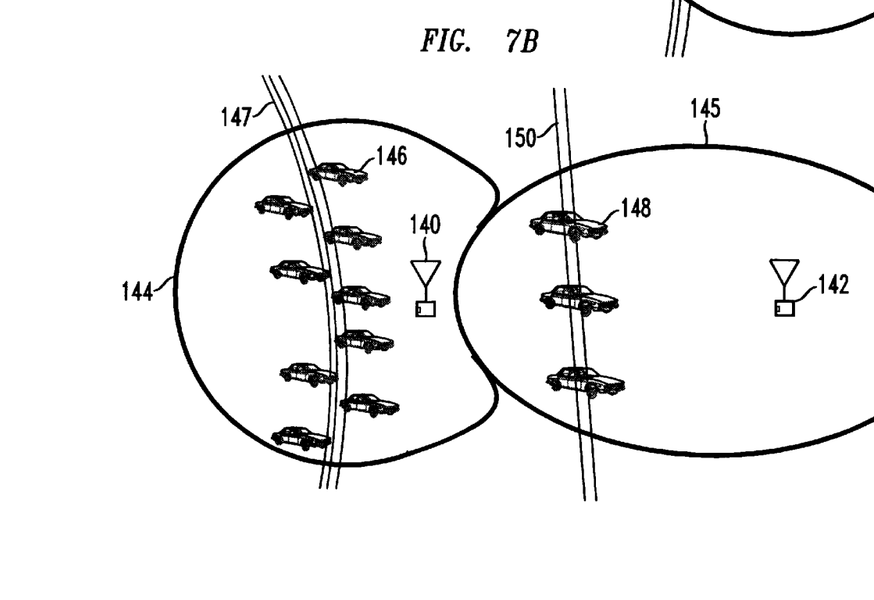

If the traffic load and/or interference level for a serving base station increases, the RF coverage system can be used to change the RF coverage by providing information by location which can be used to derive or determine RF coverage for a location. FIGS. 7A and 7B show an example of how the system using the RF coverage database can provide dynamic or automatic determination of RF coverage between particular base stations 140 and 142. For example, if location information with associated information is collected over a period of time, an RF coverage database or map is generated which provides an RF coverage area 144 for a base station 140 and a RF coverage area 145 for the base station 142 depending on certain parameters, such as traffic load(s) for the base station(s) 140 and/or 142. Given the traffic load and any other parameter(s), the MSC 58 (FIG. 2) determines the corresponding coverage areas 144 and 145 for the base stations 140 and 142 respectively. The MSC 58 (FIG. 2) can send the corresponding positions to the local databases of the base stations 140 and 142. If the traffic load measurements of the base station 140 and the base station 142, which can be measured by interference levels within the geographic area 144 and/or 145, remain at that particular level, a wireless unit 146 on a highway 147 or a wireless unit 148 on a road 150 within the geographic area 144 establishes a call with the serving base station 140. The wireless unit 146 or 148 accomplishes this by sending a location message used to locate the wireless unit 148 or 148. Given the location of the wireless unit 146 or 148, the serving base station 140 and/or the MSC determines that the base station 140 acts as the serving base station for the current set of parameters or operating conditions.

If the traffic load increases, for example the traffic on the highway 147 increases dramatically as shown in FIG. 7B, the coverage area 144 corresponding to the base station 140 is reduced or changed as reflected by the information in the local database of the serving base station 140 or the information in the local database is updated from information in the main database of the MSC 58 (FIG. 2), or the information in the main database which the MSC 58 maintains to dynamically change the coverage of base stations 140 and 142. Additionally, the coverage area 145 for the base station 142 is increased to encompass the position of the wireless unit 148 on the road 150. Alternatively, the coverage area can automatically change during certain times, for example from 3PM to 6PM, or due to anticipated changes in the operating conditions. Depending on the embodiment, an existing call established between the wireless unit 148 and the base station 140 can be handed off to the base station 142 or the call is allowed to end with the serving base station and any new calls initiated or terminated within the new coverage area 145 are established through the base station 142 as the serving base station.

In another application, the RF coverage system can be used in conjunction with a dynamic channel allocation scheme to determine the appropriate coverage for a geographic area and/or a particular location. Dynamic channel allocation refers to the borrowing of carriers or frequencies by base stations needing additional capacity. When a base station borrows the frequency from another base station, the local RF coverage is affected by this additional frequency through co-channel interference and adjacent channel interference. As such, the borrowed frequency might bring it close to the use of the same frequency in a different cluster of cells (thereby causing co-channel interference) and may affect carriers used by other base stations with frequencies close to the borrowed frequency (thereby causing adjacent channel interference). The power used at the location of a wireless unit for the borrowed carrier also has a significant effect on the level of co-channel or adjacent channel interference.

Figure 8:
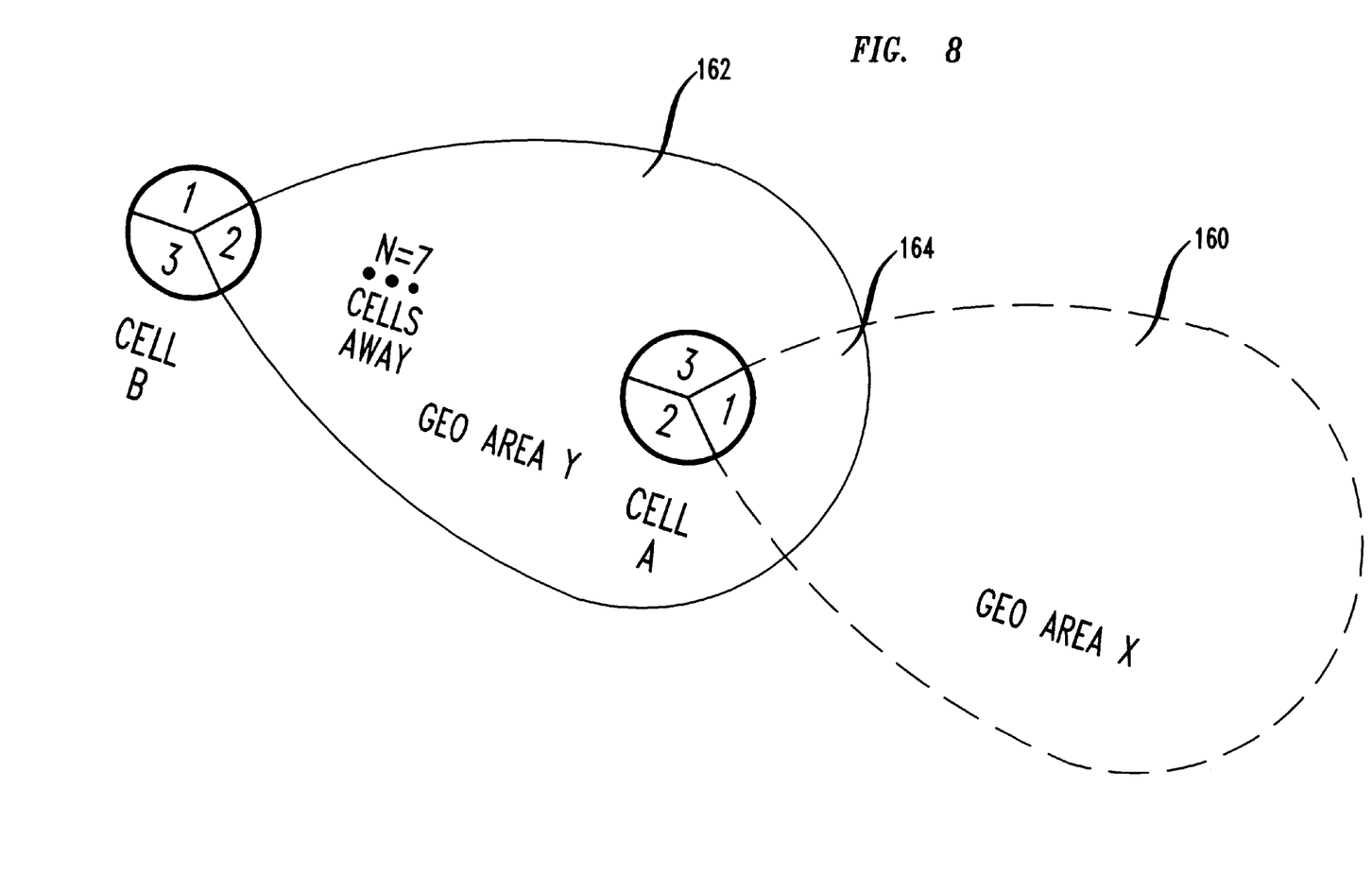
FIG. 8 shows an example of how the coverage system using location information can be used in a portion of a wireless communications system.

FIG. 8 shows how the RF coverage system can be used to select a frequency and a power to transmit at the frequency for a location in a geographic area covered by overlapping coverage areas 160 and 162. For example, the coverage area 160 is defined as a set of positions for which the base station of sector 1 in Cell A provides coverage over a set of frequencies, and the coverage area 162 is defined as a set of positions for the base station of sector 2 in Cell B over a different set of frequencies. In this example, Cell A is one of a cluster of N=7 field of cells which supports frequencies F1, F2, F3 and F4 in sector 1 in geographic region 160. Cell B is in a different cluster of N=7 cells which supports frequencies F5, F6, F7 and F8 on sector 2 in geographic coverage area 162. The cells A and B have a dynamic channel allocation feature where a frequency can be moved from another cell if capacity is needed. Accordingly, if the traffic demand in Cell B increases, Cell B can borrow frequency F1 and transmit on frequency F1 on sector 2 of cell B. As such, a co-channel interference is caused in the geographic coverage area 160 which degrades the quality of frequency F1 being used by Cell A for locations in the area 164 created by the intersection of area 160 and area 162. Since the RF coverage database is constantly updated, the coverage area for sector 1 of Cell A taking the additional parameter of frequency F1 is determined using the information by location to exclude the locations in the area created by the intersection 164 of area 160 and 162. Thus, the base station for cell A or sector 1 does not use frequency F1 for locations in area 164.

Furthermore, using the example of FIG. 8, if the coverage area 160 for sector 1 of Cell A intersects with the coverage area 162 of sector 2 in Cell B, the base station for Cell A could send a message to the base station of Cell B (through the MSC or directly depending on the embodiment) requesting the base station for Cell B to lower the transmit power of frequency F1 a small amount at a time until the co-channel or adjacent channel interference disappears from the geographic area 160. As such, the coverage area for sector 1 of Cell A for frequency F1 can be the same as the coverage area 160 and the coverage area for frequency F1 in sector 2 of cell B can be the same as the geographic area 162. Thus, frequencies borrowed for a particular location can be transmitted at a power determined to provide an adequate level of signal quality while reducing the co-channel or adjacent channel interference produced by the borrowed frequency.

In addition to the embodiment described above, alternative configurations of the RF coverage system according to the principles of the present invention are possible which omit and/or add components and/or use variations or portions of the described system. The manner of measuring, determining, monitoring, transferring, storing and/or sending location information and/or associated information depends on the particular embodiment. Additionally, once the information associated with the position of the wireless unit is stored, the resulting RF coverage database can be manipulated, analyzed and/or used in different ways within the wireless communication system depending on the particular application. The location information can be stored in a variety of manners and locations, and in being used by the wireless communications system to determine RF coverage, the manner in which the information is stored manipulated, augmented and deployed within the wireless communications systems can also vary.

For example, if the RF coverage system stores information by location and wireless unit type, such as vendor type and/or model, the RF coverage system can be used to identify the service quality of wireless units by vendor. As such, information in the RF coverage system can be used to derive or determine how a wireless unit of a certain type is to be serviced at a particular location. If the embodiment of the RF coverage system obtains information by location and wireless unit identity, such as a wireless unit identification number, electronic serial number or phone number, the information obtained by the RF coverage system can be used to derive or determine how a particular wireless unit is to be serviced at a particular location. Additionally, if the RF coverage system obtains information by location and wireless unit identity, the information obtained by the RF coverage system can be used to identify a rogue wireless unit. A rouge wireless unit is a wireless unit that is not operating properly, for example transmitting at a higher power level than provided for in the wireless communications system. The subscriber is unaware of any service problem, but the wireless unit causes other wireless units to lose signal quality. By storing the wireless unit identity in association with signal quality measurements for the wireless unit and/or time, the identity of the rogue wireless unit could be determined.

Depending on the embodiment, components of the RF coverage system and/or the wireless communications system can be added, moved, changed or omitted. For example, the RF coverage system as described can be implemented in a TDMA system, but the RF coverage system can be used with other wireless communications systems based on other radio protocols, such as CDMA, Global System for Mobile Communications (GSM), and/or Advanced Mobile Phone System (AMPS). The RF coverage system and portions thereof can be distributed at different locations throughout the wireless communication system, such as the wireless unit, the serving base station, the MSC and/or the neighboring base stations. An embodiment of the RF coverage system has been described with a GPS system to determine location information at the wireless unit. Any other method to determine the location of the wireless unit can be used, such as differential GPS or triangulation methods in which signals from the wireless unit are received at different base stations and the delays between the received signals enable the location of the wireless unit to be determined through triangulation. Moreover, location has been given in terms of latitude and longitude, but other ways to designate location or an area can be used.

As would be understood by one of ordinary skill in the art, different forms and kinds of location information can be used in the RF coverage mapping process to link or associate a particular location with associated information, such as signal quality information, and other parameters, such as a particular base station, traffic load and frequency. Additionally, the location information and associated information stored in the wireless communications system can be manipulated or updated. Moreover, the location information and associated information can be modified or provided to the wireless communications system in different form so long as the location information and associated information is derived from the corresponding location information and associated information. Furthermore, the RF coverage system can be implemented in different configurations and portions thereof can be implemented in application specific integrated circuits, software-driven processing circuitry, firmware or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of determining coverage of a wireless communications system for a particular geographic area, said method comprising:

obtaining location information including at least a current location of a wireless unit operating in said wireless communications system;

obtaining an identity characteristic for said wireless unit, including at least an equipment type for said mobile unit;

obtaining at least one measurement on at least one signal between said wireless unit at said current location and at least one base station;

storing said measurement and said identity characteristic in association with said location information;

processing said stored location, measurement and identity characteristic information for a plurality of locations to provide an RF coverage database for said particular geographic area;

adjusting RF transmission parameters for identified wireless units at given locations based on said RF coverage database.

2. The method of claim 1 comprising the steps of:

determining said location information at said wireless unit; and sending said location information and said measurement from said wireless unit to said base station.

3. The method of claim 2 wherein said step of determining includes:

using a global positioning system (GPS) receiver integrated with said wireless unit to obtain said location information at said wireless unit.

4. The method of claim 1 wherein said step of obtaining location information includes:

performing by a wireless unit at said location at least one signal quality measurement on at least one signal received from said base station.

5. The method of claim 1 further comprising:

receiving by a base station said location information from said wireless unit.

6. The method of claim 1 further comprising:

receiving by a base station said measurement from said wireless unit resulting from a measurement of at least one signal quality measurement on at least one signal received from said base station.

7. The method of claim 1 further comprising:

performing by said base station at least one signal quality measurement from at least one signal received from said wireless unit at said location.

8. The method of claim 1 wherein said storing includes:

storing said measurement by said location information and wireless unit identity.

9. The method of claim 1 wherein said storing includes:

storing said measurement by said location information, said identity characteristic and traffic load for a base station.

10. The method of claim 1 wherein said storing includes:

storing said measurement by said location information, said identity characteristic and base station identity.

11. The method of claim 1 comprising:

providing a location trigger; and performing said steps of obtaining in response to said location trigger.

12. The method of claim 1 wherein said identity characteristic further includes a wireless unit identity for said wireless unit.

13. The method of claim 12 wherein said wireless unit identity is manifested as a wireless unit identification number for said wireless unit.

14. The method of claim 12 wherein said wireless unit identity is manifested as an electronic serial number for said wireless unit.

15. The method of claim 12 wherein said wireless unit identity is manifested as a phone number for said wireless unit.

16. A method of determining coverage of a wireless communications system for a particular geographic area, said method comprising:

obtaining location information including at least a current location of a wireless unit operating in said wireless communications system;

obtaining at least one measurement on at least one signal between said wireless unit at said location and at least one base station in response to a location trigger, and determining a proximity to said location trigger based on said location information;

storing said measurement in association with said location information;

processing said stored location and measurement information for a plurality of locations to provide an RF coverage database for said particular geographic area;

adjusting RF transmission parameters for wireless units at given locations based on said RF coverage database.

* * * * *